United States Patent
Iwase

(10) Patent No.: US 9,302,699 B2
(45) Date of Patent: Apr. 5, 2016

(54) ELECTRIC POWER STEERING APPARATUS

(75) Inventor: Tadayoshi Iwase, Tochigi (JP)

(73) Assignee: SHOWA CORPORATION, Saitama (JP)

( * ) Notice: Subject to any disclaimer, the term of this patent is extended or adjusted under 35 U.S.C. 154(b) by 641 days.

(21) Appl. No.: 13/422,877

(22) Filed: Mar. 16, 2012

(65) Prior Publication Data

US 2013/0075191 A1   Mar. 28, 2013

(30) Foreign Application Priority Data

Sep. 26, 2011 (JP) ................. 2011-208938

(51) Int. Cl.
*B62D 6/10* (2006.01)
*B62D 5/04* (2006.01)

(52) U.S. Cl.
CPC ................ *B62D 5/0463* (2013.01)

(58) Field of Classification Search
CPC .................................. B62D 5/0463
USPC ........................................ 701/41, 42
See application file for complete search history.

(56) References Cited

U.S. PATENT DOCUMENTS

| | | | |
|---|---|---|---|
| 5,236,056 A | 8/1993 | Pfeffer et al. | |
| 5,978,721 A * | 11/1999 | Kagawa et al. | 701/41 |
| 6,039,144 A * | 3/2000 | Chandy | B62D 5/0466 180/446 |
| 6,779,626 B2 * | 8/2004 | Matsuoka et al. | 180/446 |
| 2002/0189371 A1 | 12/2002 | Nakane et al. | |
| 2003/0209087 A1 | 11/2003 | Nakane et al. | |
| 2006/0137474 A1 | 6/2006 | Nakane et al. | |
| 2012/0232759 A1 | 9/2012 | Oniwa et al. | |

FOREIGN PATENT DOCUMENTS

| | | |
|---|---|---|
| EP | 2502805 | 9/2012 |
| JP | 2000-095131 | 4/2000 |
| JP | 2003-149062 | 5/2003 |
| WO | WO 2011/062145 | 5/2011 |

\* cited by examiner

*Primary Examiner* — Mussa A Shaawat
*Assistant Examiner* — Kyung Kim
(74) *Attorney, Agent, or Firm* — Leason Ellis LLP

(57) ABSTRACT

An electric power steering apparatus includes: a detector that detects a value corresponding to a steering torque of a steering wheel; a correcting unit that corrects a detection value detected by the detector by taking into account a hysteresis between an actual steering torque and the detection value detected by the detector; and a target current calculating unit that calculates a target current which is supplied to an electric motor on the basis of a corrected detection value corrected by the correcting unit. The correcting unit makes a correction by using a correction value corresponding to the detection value detected by the detector so as to make the hysteresis small in a case where the steering torque is small and large in a case where the steering torque is large.

6 Claims, 10 Drawing Sheets

ELECTRIC POWER STEERING APPARATUS

CROSS REFERENCE TO RELATED APPLICATIONS

This application is based on and claims priority under 35 USC §119 from Japanese Patent Application No. 2011-208938 filed Sep. 26, 2011.

BACKGROUND

1. Technical Field

The present invention relates to an electric power steering apparatus.

2. Related Art

Recently, there has been suggested an electric power steering apparatus that controls the amount of a current for flowing through an electric motor in accordance with steering force of a steering wheel detected by a torque sensor.

For example, an electric power steering apparatus disclosed in Japanese Patent Application Laid Open Publication No. 2003-149062 includes an electric motor that supplies power to a steering mechanism of a steering and assists steering force of the steering, a torque sensor that detects the steering force of the steering, and a control circuit that controls the amount of a current for flowing through the electric motor in accordance with the steering force detected by the torque sensor. The torque sensor is configured by a torsion bar that connects an input shaft and an output shaft coaxially, a magnet that is attached to an end part of the input shaft, a pair of magnetic yokes that is attached to an end part of the output shaft, a magnetic sensor that detects a magnetic flux density generated between the pair of magnetic yokes, and the like.

SUMMARY

An output value from a torque sensor contains, as a disturbance, a mechanical friction resistance generated in a steering system such as a steering wheel and an input shaft. Thus, a phenomenon (hysteresis) showing difference between an output value of the torque sensor in a case of steering the steering wheel from left to right and an output value of the torque sensor in a case of steering the steering wheel from right to left occurs.

Accordingly, it is desirable to improve steering feeling and safety by controlling the amount of a current supplied to an electric motor in consideration of the hysteresis.

In order to attain the above object, in an aspect of the present invention, there is provided an electric power steering apparatus including: a detector that detects a value corresponding to a steering torque of a steering wheel; a correcting unit that corrects a detection value detected by the detector by taking into account a hysteresis between an actual steering torque and the detection value detected by the detector; and a target current calculating unit that calculates a target current which is supplied to an electric motor on the basis of a corrected detection value corrected by the correcting unit. The correcting unit makes a correction by using a correction value corresponding to the detection value detected by the detector so as to make the hysteresis small in a case where the steering torque is small and large in a case where the steering torque is large.

Here, a sign of the correction value of the correcting unit may be inverted between a case where an absolute value of the detection value detected by the detector is smaller than a predetermined value and a case where the absolute value is larger than the predetermined value.

Further, the correcting unit may include a determination unit that determines the correction value on the basis of the detection value detected by the detector, and an output unit that corrects the detection value detected by the detector by performing four arithmetic operations using the correction value determined by the determination unit with regard to the detection value detected by the detector and outputs the corrected detection value.

Furthermore, on condition that a direction of the steering torque is set to be positive in a case where the direction is one rotating direction of the steering wheel and is set to be negative in a case where the direction is the other rotating direction, the determination unit of the correcting unit may determine that a sign of the correction value is positive in a case where an absolute value of the detection value detected by the detector is smaller than a predetermined value, and negative in a case where the absolute value is larger than the predetermined value, and the output unit may correct the detection value detected by the detector by adding the correction value determined by the determination unit to the detection value detected by the detector in a case where the steering torque increases, and by subtracting the correction value determined by the determination unit from the detection value detected by the detector in a case where the steering torque decreases.

According to the present invention, it is possible to improve steering feeling and safety since the amount of a current supplied to an electric motor is controlled in consideration of a hysteresis.

BRIEF DESCRIPTION OF THE DRAWINGS

Exemplary embodiment(s) of the present invention will be described in detail based on the following figures, wherein.

DETAILED DESCRIPTION

An exemplary embodiment of the present invention will be described in detail below with reference to the accompanying drawings.

Figure 1:
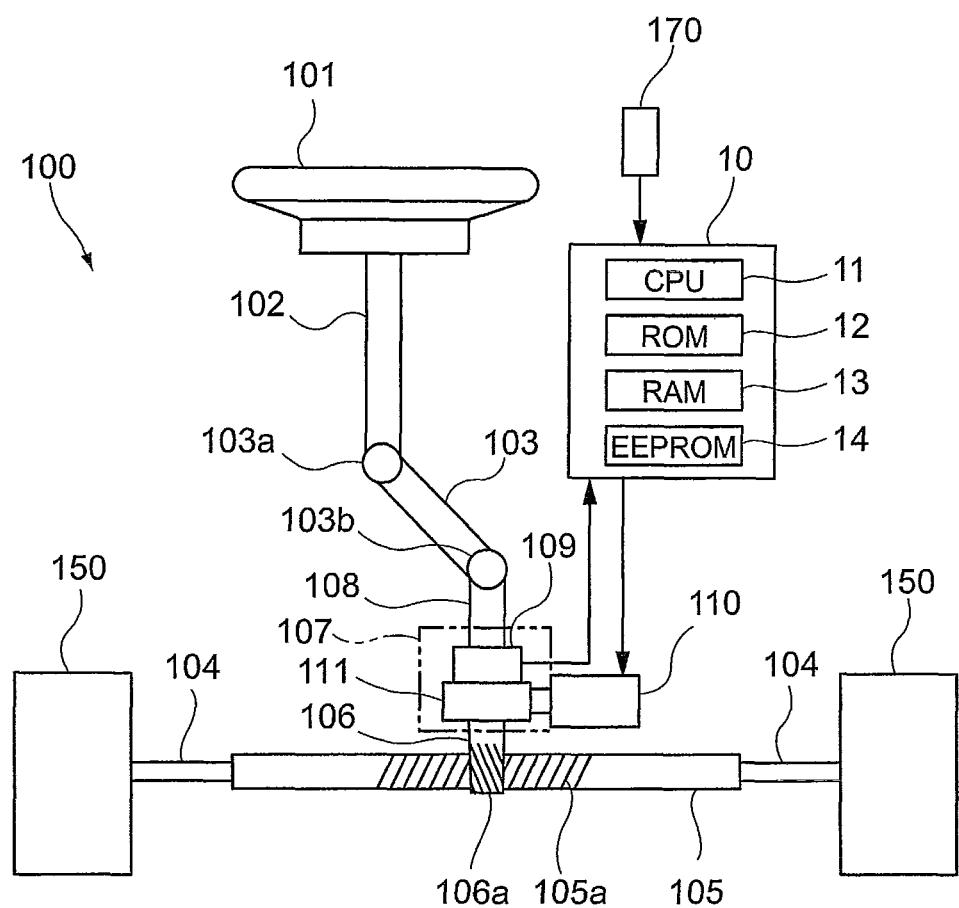
FIG. 1 is a diagram showing an outline configuration of an electric power steering apparatus according to the exemplary embodiment.

FIG. 1 is a diagram showing an outline configuration of an electric power steering apparatus 100 according to the exemplary embodiment.

The electric power steering apparatus 100 (hereinafter sometimes called simply the "steering apparatus 100") acts as the steering apparatus for changing the direction of travel of a vehicle into any direction, and, in the exemplary embodiment, exemplifies a configuration as applied to an automobile.

The steering apparatus 100 includes a steering wheel (handle) 101 in the form of wheel which a driver operates, and a steering shaft 102 provided integrally with the steering wheel 101. Further, the steering apparatus 100 includes an upper connecting shaft 103 that is connected with the steering shaft 102 via a universal coupling 103a, and a lower connecting shaft 108 that is connected with the upper connecting shaft 103 via a universal coupling 103b. The lower connecting shaft 108 rotates with rotation of the steering wheel 101.

Also, the steering apparatus 100 includes tie rods 104 connected respectively to right and left front wheels 150 as rolling wheels, and a rack shaft 105 connected to the tie rods 104. Also, the steering apparatus 100 includes a pinion 106a that forms a rack-and-pinion mechanism in conjunction with rack teeth 105a formed on the rack shaft 105. The pinion 106a is formed at a lower end portion of a pinion shaft 106.

Also, the steering apparatus 100 includes a steering gear box 107 in which the pinion shaft 106 is housed. In the steering gear box 107, the pinion shaft 106 is connected to the lower connecting shaft 108 via a torsion bar. In addition, provided in the steering gear box 107 is a torque sensor 109 that outputs an electric signal (for example, a voltage signal) corresponding to a relative rotation angle between the lower connecting shaft 108 and the pinion shaft 106.

Also, the steering apparatus 100 includes an electric motor 110 supported by the steering gear box 107, and a speed reduction mechanism 111 that reduces drive power of the electric motor 110 and transfers the reduced drive power to the pinion shaft 106. The electric motor 110 according to the exemplary embodiment is a three-phase brushless motor. The magnitude and direction of an actual current actually passing through the electric motor 110 are detected by a motor current detector 33 (see FIG. 4).

The steering apparatus 100 includes a control device 10 that controls actuation of the electric motor 110. Inputted to the control device 10 are an output value from the aforementioned torque sensor 109, and an output value from a vehicle speed sensor 170 that detects a vehicle speed Vc, which is a traveling speed of the automobile.

The steering apparatus 100 configured as described above detects a value corresponding to the steering torque T applied to the steering wheel 101 on the basis of output from the torque sensor 109, drives the electric motor 110 in accordance with the detected value, and transmits torque produced by the electric motor 110 to the pinion shaft 106. Thereby, the torque produced by the electric motor 110 assists a driver's steering force applied to the steering wheel 101.

Next, a description will be given with regard to the control device 10.

Figure 2:
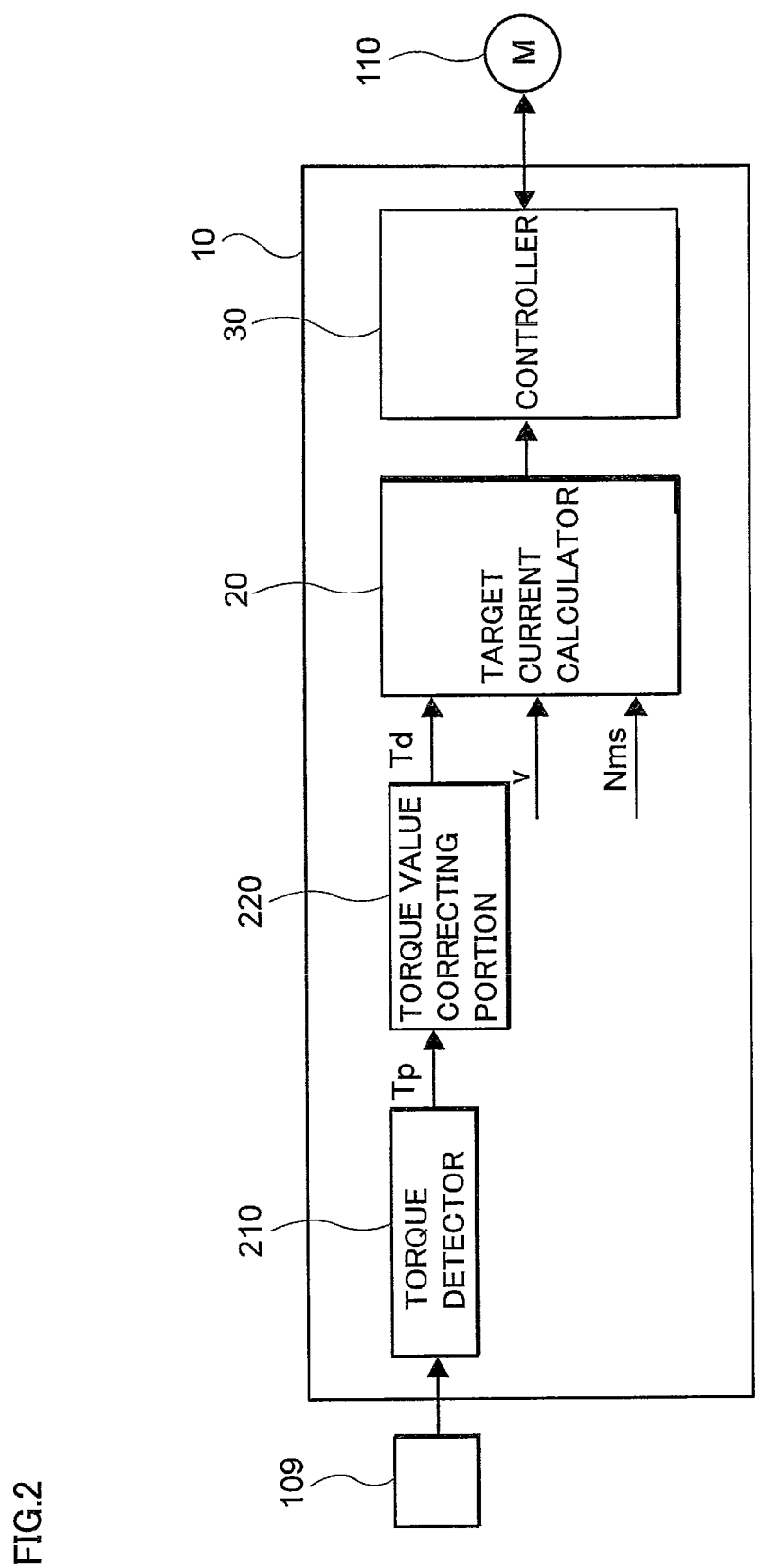
FIG. 2 is a schematic configuration diagram of the control device of the steering apparatus.

FIG. 2 is a schematic configuration diagram of the control device 10 of the steering apparatus 100.

The control device 10 is an arithmetic logic circuit formed of a CPU 11, a ROM 12, a RAM 13 and the like.

Inputted to the control device 10 are: an electric signal outputted from the above-mentioned torque sensor 109; a vehicle speed signal v obtained through the conversion of the vehicle speed Vc detected by the vehicle speed sensor 170 into an output signal; and the like.

The control device 10 includes a torque detector 210 that detects a value corresponding to the steering torque T on the basis of the signal inputted from the torque sensor 109, and a torque value correcting portion 220 that corrects the output value (Tp) from the torque detector 210 and outputs a control torque signal Td that is a torque signal after the correction. Further, the control device 10 includes a target current calculator 20 that calculates a target assist torque on the basis of the control torque signal Td outputted from the torque value correcting portion 220, and calculates a target current required for the electric motor 110 to supply the target assist torque, and a controller 30 that performs feedback control or the like on the basis of the target current calculated by the target current calculator 20.

First, a detailed description will be given with regard to the torque detector 210.

The torque detector 210 calculates a steering torque T on the basis of a signal inputted from the torque sensor 109, and outputs, to the torque value correcting portion 220, a detected torque signal Tp obtained by converting the calculated steering torque T into an electric signal (voltage signal). A map showing correspondence between the electric signal outputted from the torque sensor 109 and the steering torque T has been stored in the ROM 12, and the torque detector 210 calculates the steering torque T by substituting the electric signal from the torque sensor 109 into the map. Alternatively, a function showing the correspondence between the electric signal outputted from the torque sensor 109 and the steering torque T has been incorporated, and the torque detector 210 may calculate the steering torque T by substituting the electric signal from the torque sensor 109 into the function. Note that, the torque detector 210 outputs a value by setting a state where the twisted amount of the torsion bar is zero at a middle point, setting a steering torque T in a clockwise direction as a positive value, and setting a steering torque in a counterclockwise direction as a negative value.

The torque value correcting portion 220 will be described in detail below.

Figure 3:
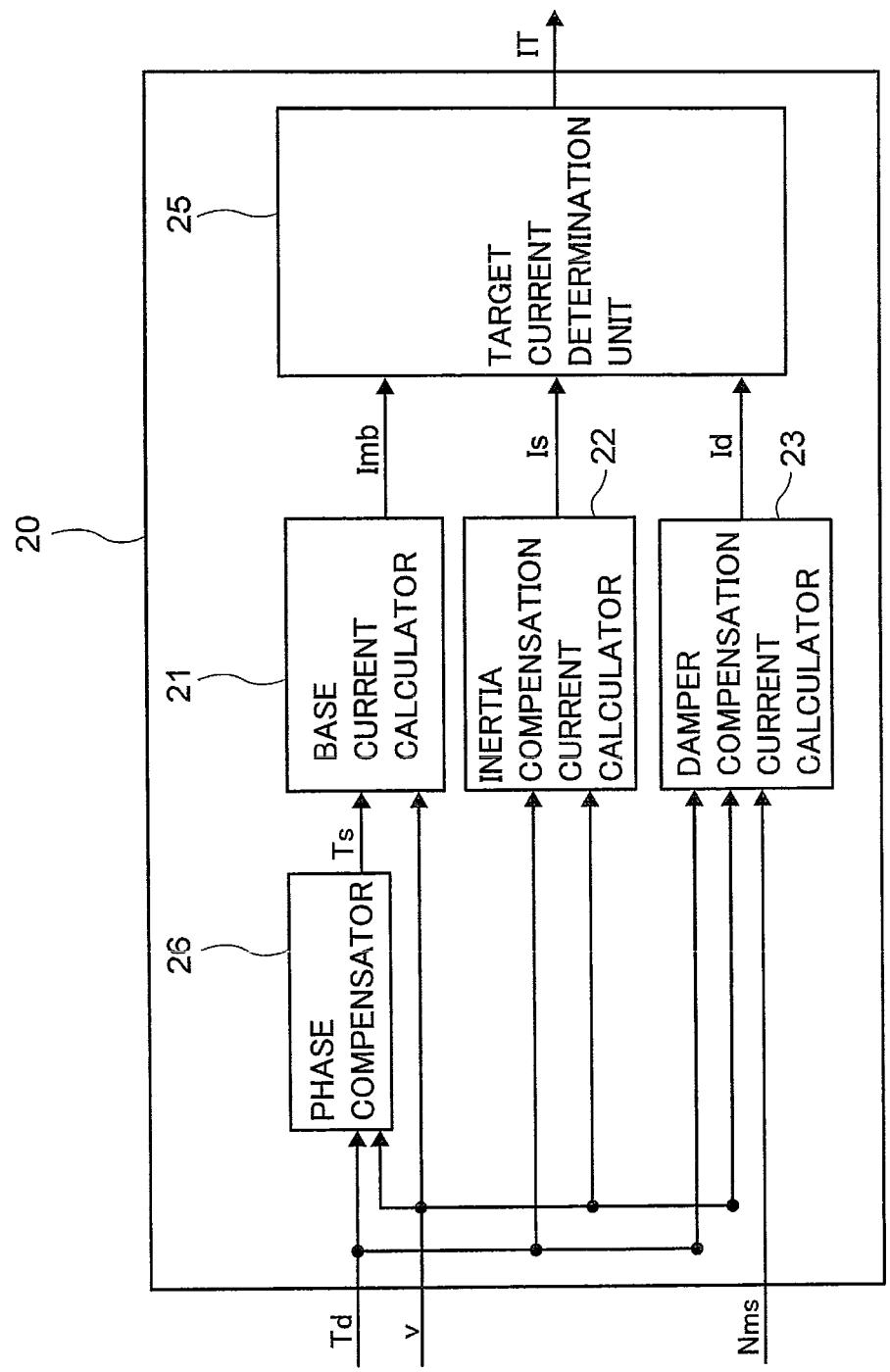
FIG. 3 is a schematic configuration diagram of the target current calculator.

Next, a detailed description will be given with regard to the target current calculator 20. FIG. 3 is a schematic configuration diagram of the target current calculator 20.

The target current calculator 20 includes a base current calculator 21 that calculates a base current for use as a reference for setting the target current, and an inertia compensation current calculator 22 that calculates a current to cancel out an inertia moment of the electric motor 110, and a damper compensation current calculator 23 that calculates a current to limit motor rotations. Also, the target current calculator 20 includes a target current determination unit 25 that determines the target current on the basis of outputs from the base current calculator 21, the inertia compensation current calculator 22, the damper compensation current calculator 23, and so on. Further, the target current calculator 20 includes a phase compensator 26 that compensates a phase of the control torque signal Td.

Inputted to the target current calculator 20 are the torque signal Td, the vehicle speed signal v, and a rotation speed signal Nms obtained through the conversion of a rotation speed Nm of the electric motor 110 into an output signal. By way of example, the rotation speed signal Nms may be obtained through the differentiation of an output signal of a sensor (for example, a rotor position detecting circuit formed of a resolver, a rotary encoder or the like for detecting a rotation position of a rotor) that detects a rotation position of the rotator (rotor) of the electric motor 110 which is, for example, the three-phase brushless motor.

Incidentally, since the signals from the vehicle speed sensor 170 and the like are inputted to the control device 10 in analog form, the analog signals are converted into digital signals by an A/D converter (not shown in the figure) and the digital signals are captured in the target current calculator 20.

The base current calculator 21 calculates the base current on the basis of a torque signal Ts obtained through a phase compensation of the torque signal Td by the phase compensator 26 and the vehicle speed signal v from the vehicle speed sensor 170, and outputs a base current signal Imb containing information on the base current. Incidentally, the base current calculator 21 calculates the base current by, for example, substituting the detected torque signal Ts and the vehicle speed signal v into a map showing correspondence between a combination of the torque signal Ts and the vehicle speed signal v and the base current, which has previously been created on the basis of an empirical rule and been stored in the ROM 12.

The inertia compensation current calculator 22 calculates an inertia compensation current to cancel out the inertia moment of the electric motor 110 and a system, on the basis of the torque signal Td and the vehicle speed signal v, and outputs an inertia compensation current signal Is containing information on the inertia compensation current. Incidentally, the inertia compensation current calculator 22 calculates the inertia compensation current by, for example, substituting the detected torque signal Td and the vehicle speed signal v into a map showing correspondence between a combination of the torque signal Td and the vehicle speed signal v and the inertia compensation current, which has previously been created on the basis of an empirical rule and been stored in the ROM 12.

The damper compensation current calculator 23 calculates a damper compensation current to limit the rotations of the electric motor 110, on the basis of the torque signal Td, the vehicle speed signal v, and the rotation speed signal Nms of the electric motor 110, and outputs a damper compensation current signal Id containing information on the damper compensation current. Incidentally, the damper compensation current calculator 23 calculates the damper compensation current by, for example, substituting the detected torque signal Td, the vehicle speed signal v and the rotation speed signal Nms into a map showing correspondence between a combination of the torque signal Td, the vehicle speed signal v and the rotation speed signal Nms and the damper compensation current, which has previously been created on the basis of an empirical rule and been stored in the ROM 12.

The target current determination unit 25 determines the target current on the basis of the base current signal Imb outputted by the base current calculator 21, the inertia compensation current signal Is outputted by the inertia compensation current calculator 22 and the damper compensation current signal Id outputted by the damper compensation current calculator 23, and outputs a target current signal IT containing information on the current. The target current determination unit 25 calculates the target current by, for example, substituting a compensation current obtained by adding the inertia compensation current to the base current and subtracting the damper compensation current therefrom into a map showing correspondence between the compensation current and the target current, which has previously been created on the basis of an empirical rule and been stored in the ROM 12.

Figure 4:
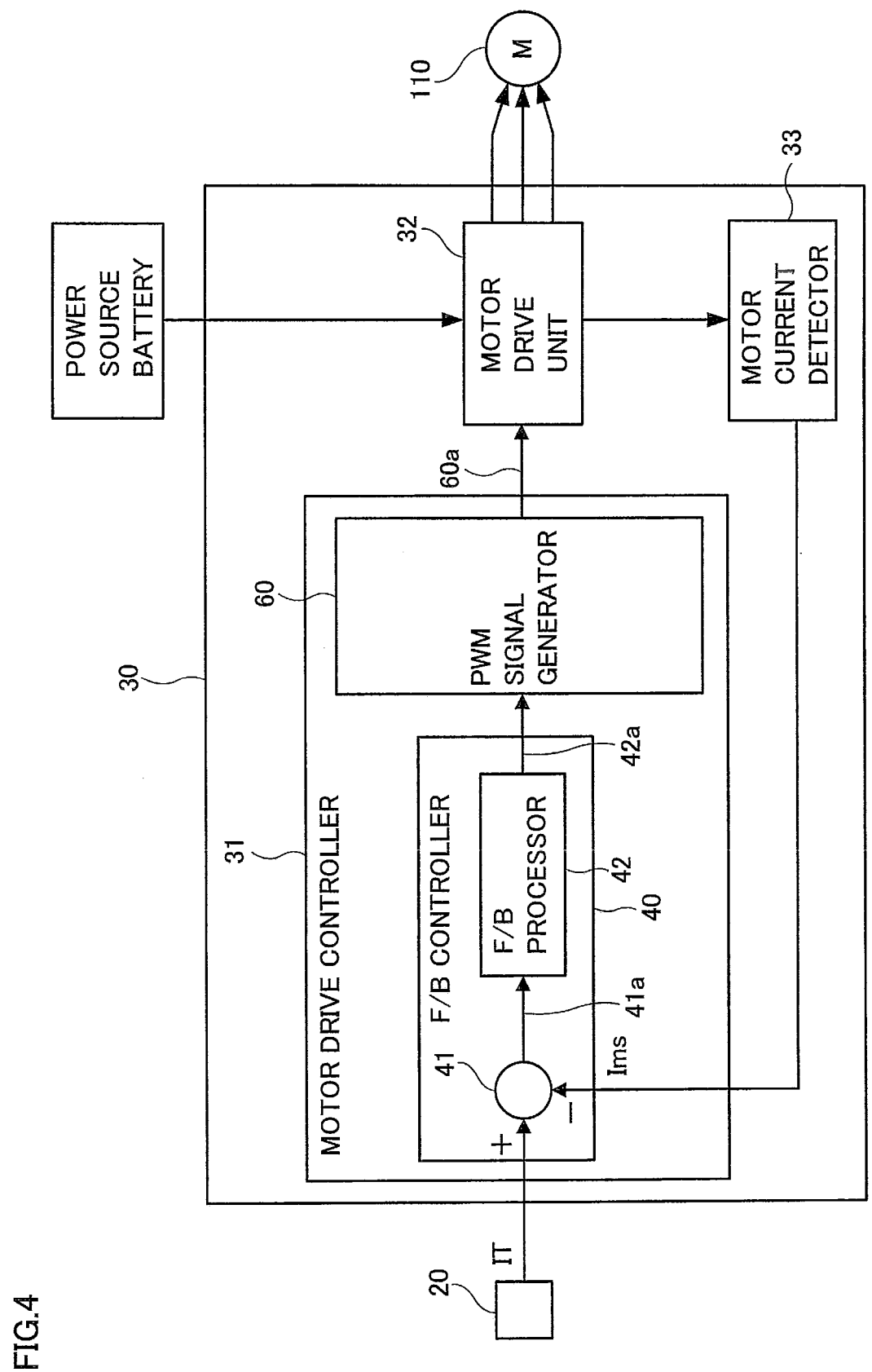
FIG. 4 is a schematic configuration diagram of the controller.

Next, a detailed description will be given with regard to the controller 30. FIG. 4 is a schematic configuration diagram of the controller 30.

The controller 30 includes a motor drive controller 31 that controls the actuation of the electric motor 110, a motor drive unit 32 that drives the electric motor 110, and the motor current detector 33 that detects the actual current Im actually flowing through the electric motor 110.

The motor drive controller 31 includes a feedback (F/B) controller 40 that performs feedback control on the basis of a deviation between the target current finally determined by the target current calculator 20 and the actual current Im detected by the motor current detector 33, which is supplied to the electric motor 110, and a PWM signal generator 60 that generates a pulse width modulation (PWM) signal to provide PWM drive to the electric motor 110.

The feedback controller 40 includes a deviation calculator 41 that determines the deviation between the target current finally determined by the target current calculator 20 and the actual current Im detected by the motor current detector 33, and a feedback (F/B) processor 42 that performs feedback processing so that the deviation would become zero.

The deviation calculator 41 outputs, as a deviation signal 41a, the value of the deviation between the target current signal ITF outputted from the target current calculator 20 and the motor current signal Ims outputted from the motor current detector 33.

The feedback (F/B) processor 42 serves to perform feedback control so that the actual current Im would coincide with the target current, and generates and outputs a feedback processing signal 42a by, for example, outputting a signal obtained through proportional processing with a proportional element with regard to the inputted deviation signal 41a; outputting a signal obtained through integral processing with an integral element with regard to the inputted deviation signal 41a; and adding these signals together by an add operation unit.

The PWM signal generator 60 generates a PWM signal 60a on the basis of the output value from the feedback controller 40, and outputs the generated PWM signal 60a.

The motor drive unit 32 is a so-called inverter, and includes, for example, mutually independent six transistors (FET) as switching elements, in which three transistors among six are connected between a positive side line of a power supply and an electric coil of each phase and the other three transistors are connected between an electric coil of each phase and a negative side (earth) line of the power supply. The gates of two transistors selected from the six are driven to provide switching operations to these transistors, thereby controlling the drive of the electric motor 110.

The motor current detector 33 detects the value of the actual current Im flowing through the electric motor 110, from a voltage between both ends of a shunt resistor connected to the motor drive unit 32, converts the detected actual current Im into the motor current signal Ims and outputs the motor current signal Ims.

In the steering apparatus 100 having the aforementioned configuration, the output value from the torque sensor 109 contains, as disturbance, a mechanical friction resistance generated in a steering system such as the steering wheel 101 and the lower connecting shaft 108. Thus, there occurs a phenomenon (hysteresis) in which an output value of the torque sensor 109 in a case of steering the steering wheel 101 from left to right (hereinafter, referred to as "at a clockwise rotation" in some cases) and an output value of the torque sensor 109 in a case of steering the steering wheel 101 from right to left (hereinafter, referred to as "at a counterclockwise rotation" in some cases) are different from each other.

In consideration of the aforementioned phenomenon, the steering apparatus 100 according to the exemplary embodiment includes the torque value correcting portion 220 so that the detected torque signal Tp outputted from the torque detector 210 is corrected to be a value obtained by taking into account the hysteresis.

Figure 5:
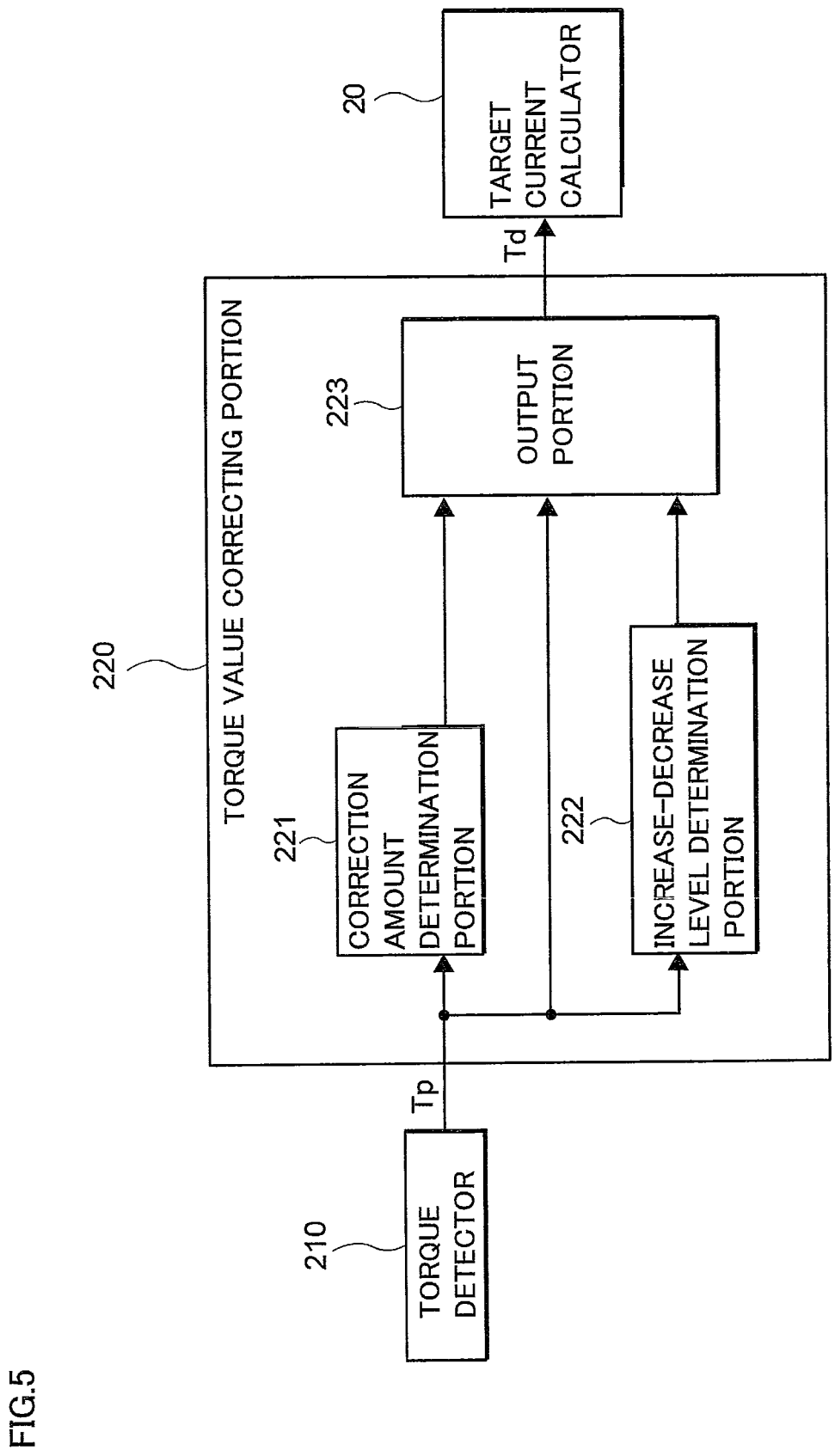
FIG. 5 is a schematic configuration diagram of the torque value correcting portion.

FIG. 5 is a schematic configuration diagram of the torque value correcting portion 220.

The torque value correcting portion 220 includes a correction amount determination portion 221 that determines a correction amount α on the basis of the detected torque signal Tp outputted from the torque detector 210, and an increase-decrease level determination portion 222 that determines increase or decrease of the steering torque T on the basis of the detected torque signal Tp outputted from the torque detector 210. Also, the torque value correcting portion 220 includes an output portion 223 that determines the control torque signal Td on the basis of the detected torque signal Tp outputted from the torque detector 210, the correction amount α determined by the correction amount determination portion 221 and the increase or decrease in the steering torque T determined by the increase-decrease level determination portion 222, and that outputs the determined control torque signal Td to the target current calculator 20.

Figure 6:
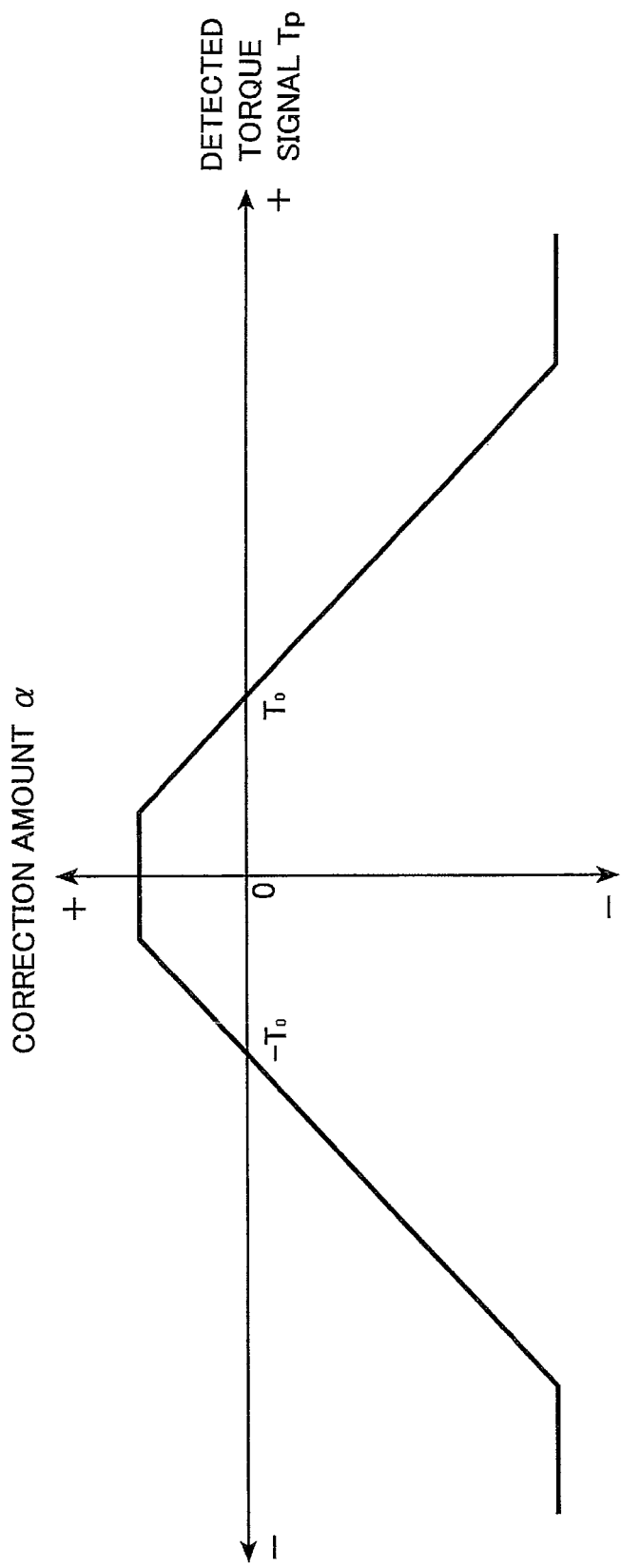
FIG. 6 is a graph showing correspondence between the detected torque signal and the correction amount.

FIG. 6 is a graph showing correspondence between the detected torque signal Tp and the correction amount α.

The correction amount determination portion 221 determines the correction amount α on the basis of the detected torque signal Tp outputted from the torque detector 210. For example, an optimized correction amount α corresponding to the detected torque signal Tp outputted from the torque detector 210 has been derived on the basis of an empirical rule, as shown in FIG. 6. Further, the correction amount determination portion 221 calculates the correction amount α by substituting the detected torque signal Tp into the map showing the correspondence between the detected torque signal Tp and the correction amount α, which has been created and stored in the ROM 12 previously. Alternatively, the correction amount α may be calculated by substituting the detected torque signal Tp into a relational expression of the detected torque signal Tp and the correction amount α, which has been created previously.

As shown in FIG. 6, in the exemplary embodiment, the correction amount α has a positive sign in a case where the absolute value of the detected torque signal Tp is smaller than the predetermined value To, and a negative sign in a case where the absolute value of the detected torque signal Tp is larger than the determined value To. That is, the sign of the correction amount α is inverted between a case where the absolute value of the detected torque signal Tp is smaller than the determined value To and a case where the absolute value is larger than the determined value To.

The increase-decrease level determination portion 222 determines increase or decrease of the steering torque T at this time on condition that a state where the twisting amount of the torsion bar is zero is set at a middle point, the steering torque T in the right direction is positive, and the steering torque T in the left direction is negative. The increase-decrease level determination portion 222 determines increase or decrease of the steering torque T at this time on the basis of a history of the detected torque signal Tp periodically inputted from the torque detector 210.

Specifically, the increase-decrease level determination portion 222 calculates an average value at this time Tpave(n) as an average value of the past detected torque signals Tp including the latest detected torque signal Tp(n), the number of which is k, out of the detected torque signals Tp stored in the RAM 13, and also calculates the last average value Tpave (n−1) as an average value of the past detected torque signals Tp not including the latest detected torque signal Tp(n), the number of which is k, that is, the past detected torque signals Tp which has been inputted before the latest detected torque signal Tp(n) is inputted. For example, in a case of k=2, Tpave (n)=(Tp(n)+Tp(n−1))/2, and Tpave(n−1)=(Tp(n−1)+Tp(n−2))/2 are obtained.

The increase-decrease level determination portion 222 determines the increase-decrease level of the steering torque T on the basis of change of the average value ΔTpave (=Tpave (n)−Tpave(n−1)) obtained by subtracting the last average value Tpave(n−1) from the average value at this time Tpave (n). In a case where the change of the average value ΔTpave is larger than a predetermined first determination value, the increase-decrease level determination portion 222 determines that the increased amount is large, and sets, in the RAM 13, a determination of increase which is to be set in a case where the steering torque T increases. On the other hand, in a case where the change of the average value ΔTpave is smaller than a predetermined second determination value, the increase-decrease level determination portion 222 determines that the decreased amount is large, and sets, in the RAM 13, a determination of decrease which is to be set in a case where the steering torque T decreases. Further, in a case where the change of the average value ΔTpave is not larger than the first predetermined value, the increase-decrease level determination portion 222 clears the determination of increase set in the RAM 13, and in a case where the change of the average value ΔTpave is not smaller than the second predetermined value, the increase-decrease level determination portion 222 clears the determination of decrease set in the RAM 13. Note that, for example, the first determination value may be a positive value, and the second determination value may be a negative value.

In a case where the determination of increase is set in the RAM 13, the output portion 223 outputs, as a control torque signal at this time Td(n), an electric signal corresponding to a value obtained by adding the correction amount α determined by the correction amount determination portion 221 to a value shown by the detected torque signal Tp outputted from the torque detector 210. In a case where the determination of decrease is set in the RAM 13, the output portion 223 outputs, as a control torque signal at this time Td(n), an electric signal corresponding to a value obtained by subtracting the correction amount α determined by the correction amount determination portion 221 from a value shown by the detected torque signal Tp outputted from the torque detector 210. In a case where neither the determination of increase nor the determination of decrease is set in the RAM 13, the output portion 223 outputs, as the control torque signal at this time Td(n), the same signal as the control torque signal Td(n−1) that was outputted last time.

Next, a description will be given with regard to a correction amount determination processing conducted by the correction amount determination portion 221 with a flowchart.

Figure 7:
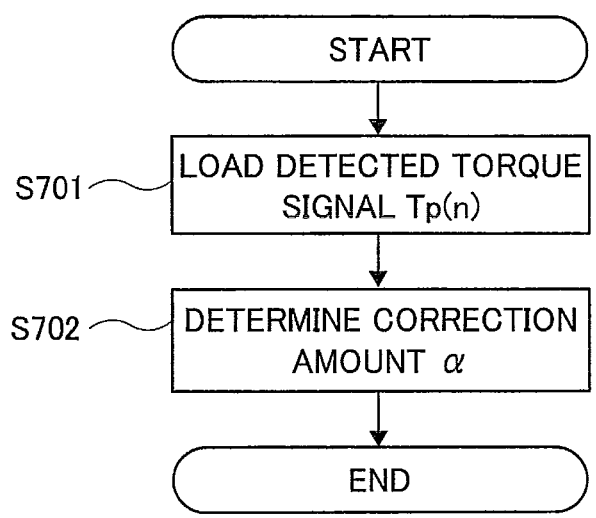
FIG. 7 is a flowchart showing a procedure of the correction amount determination processing conducted by the correction amount determination portion.

FIG. 7 is a flowchart showing a procedure of the correction amount determination processing conducted by the correction amount determination portion 221. The correction amount determination portion 221 executes the correction amount determination processing periodically, for example, at every 10 ms.

First, the correction amount determination portion 221 loads the latest detected torque signal Tp(n) outputted from the torque detector 210 and stored in the RAM 13 (step (hereinafter, simply referred to as "S") 701).

Then, the correction amount determination portion 221 determines a correction amount α on the basis of the latest detected torque signal Tp(n) loaded in S701 and the map stored in the ROM 12 (S702).

Next, a description will be given with regard to an increase-decrease level determination processing conducted by the increase-decrease level determination portion 222 with a flowchart.

Figure 8:
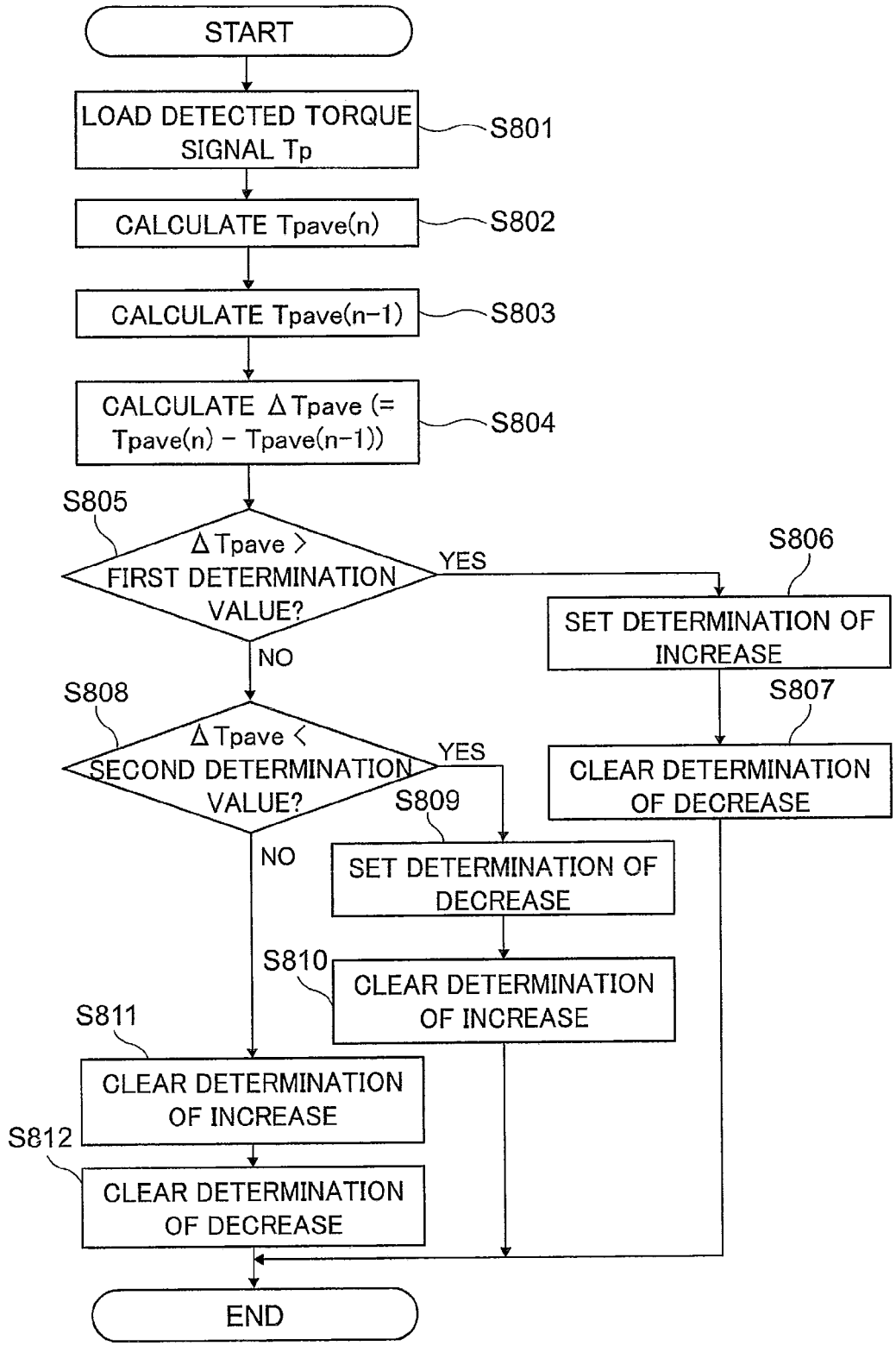
FIG. 8 is a flowchart showing a procedure of the increase-decrease level determination processing conducted by the increase-decrease level determination portion.

FIG. 8 is a flowchart showing a procedure of the increase-decrease level determination processing conducted by the increase-decrease level determination portion 222. The increase-decrease level determination portion 222 executes the increase-decrease level determination processing periodically, for example, at every 10 ms.

First, the increase-decrease level determination portion 222 loads the detected torque signal Tp(n) outputted from the torque detector 210 and stored in the RAM 13 (S801). Then, the increase-decrease level determination portion 222 calculates the average value at this time Tpave(n) (S802) and the last average value Tpave(n−1) (S803), and calculates the change of the average value ΔTpave (ΔTpave=Tpave(n)−Tpave(n−1)) (S804).

Thereafter, the increase-decrease level determination portion 222 determines whether the change of the average value ΔTpave calculated in S804 is larger than the first determination value or not (S805). In a case where the change of the average value ΔTpave is larger than the first determination value (Yes in S805), a determination of increase is set in the RAM 13 (S806), and the determination of decrease having been set in the RAM 13 is cleared (S807).

On the other hand, in a case where the change of the average value ΔTpave is not larger than the first determination value (No in S805), the increase-decrease level determination portion 222 determines whether the change of the average value ΔTpave calculated in S804 is smaller than the second determination value or not (S808). In a case where the change of the average value ΔTpave is smaller than the second determination value (Yes in S808), a determination of decrease is set in the RAM 13 (S809), and the determination of increase having been set in the RAM 13 is cleared (S810). Meanwhile, in a case where the change of the average value ΔTpave is not smaller than the second determination value (No in S808), that is, in a case where the change of the average value ΔTpave is not smaller than the second determination value and is smaller than the first determination value, the determination of increase having been set in the RAM 13 is cleared (S811), and the determination of decrease is also cleared (S812).

Next, a description will be given with regard to the output processing conducted by the output portion 223 with a flowchart.

Figure 9:
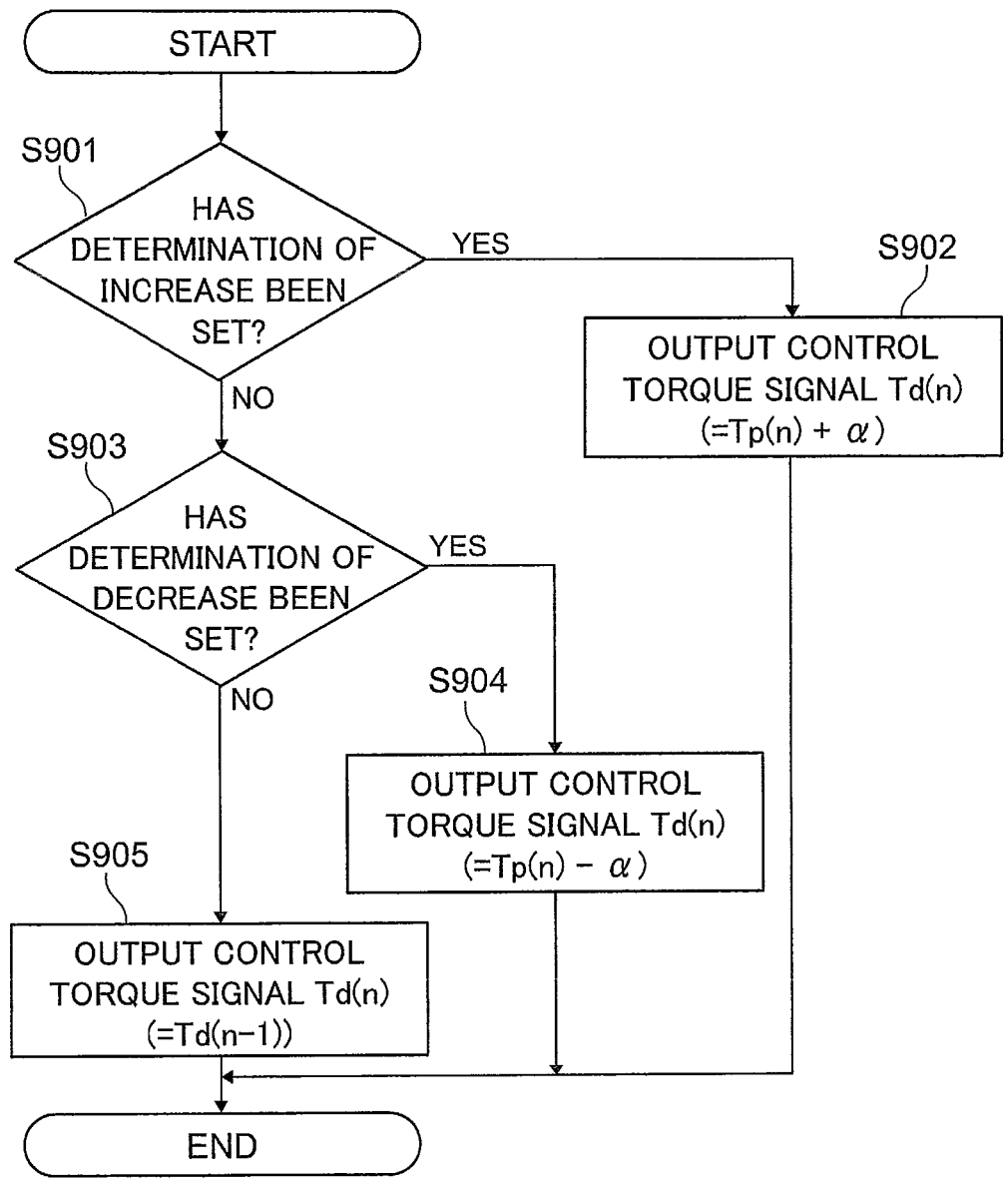
FIG. 9 is a flowchart showing a procedure of the output processing conducted by the output portion.

FIG. 9 is a flowchart showing a procedure of the output processing conducted by the output portion 223. The output portion 223 executes the output processing periodically, for example at every 10 ms.

First, the output portion 223 determines whether the determination of increase has been set in the RAM 13 or not (S901). In a case where the determination of increase has been set (Yes in S901), an electric signal corresponding to a value (Tp(n)+α) obtained by adding the correction amount α determined by the correction amount determination portion 221 to a value shown by the detected torque signal Tp(n) outputted from the torque detector 210 at this time is outputted as the control torque signal at this time Td(n) (S902).

On the other hand, in a case where the determination of increase is not set (No in S901), the output portion 223 determines whether the determination of decrease has been set in the RAM 13 or not (S903). In a case where the determination of decrease has been set (Yes in S903), an electric signal corresponding to a value (Tp(n)−α) obtained by subtracting the correction amount α determined by the correction amount determination portion 221 from a value shown by the detected torque signal Tp(n) outputted from the torque detector 210 at this time is outputted as a control torque signal at this time Td(n) (S904). Meanwhile, in a case where the determination of decrease is not set (No in S903), the same signal as the control torque signal Td(n−1) outputted last time is outputted as the control torque signal at this time Td(n) (S905).

Figure 10:
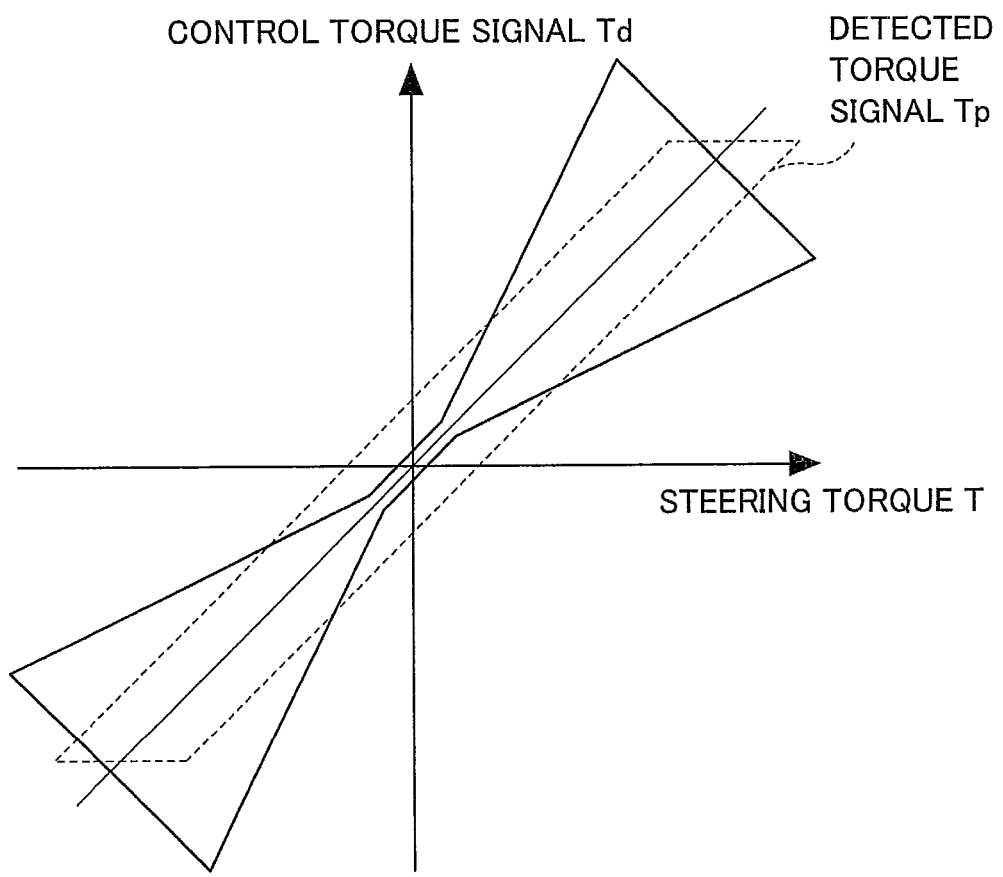
FIG. 10 is a diagram showing correspondence between the steering torque and the control torque signal in the steering apparatus according to the exemplary embodiment.

FIG. 10 is a diagram showing correspondence between the steering torque T and the control torque signal Td in the steering apparatus 100 according to the exemplary embodiment. The correspondence between the steering torque T and the control torque signal Td is shown with a solid line. Further, correspondence between the steering torque T and the detected torque signal Tp is shown with a broken line.

As mentioned above, since the hysteresis occurs in the output values from the torque sensor 109, the value of the detected torque signal Tp outputted from the torque detector 210 with regard to the steering torque T varies between the clockwise rotation of the steering wheel 101 and the counterclockwise rotation of the steering wheel 101, as shown with the broken line in FIG. 10.

In the steering apparatus 100 according to the exemplary embodiment, the correction amount α is set to be positive in a case where the absolute value of the detected torque signal Tp outputted from the torque detector 210 is small, as shown in FIG. 6. In a case where the increased amount of the steering torque T is large, that is, at the clockwise rotation of the steering wheel 101, an electric signal corresponding to a value obtained by adding the correction amount α to the value shown by the detected torque signal Tp is set as the control torque signal Td(n). In a case where the decreased amount of the steering torque T is large, that is, at the counterclockwise rotation of the steering wheel 101, an electric signal corresponding to a value obtained by subtracting the correction amount α from the value shown by the detected torque signal Tp is set as the control torque signal Td(n). Thus, in a case where the steering torque T is small, the hysteresis smaller than that of the steering torque signal Tp is obtained. In other words, in the case where the steering torque T is small, the width of the hysteresis smaller than that of the hysteresis of the detected torque signal Tp is obtained. As a result, in a case where the steering torque T is small, it is possible to obtain a characteristic exhibiting smooth return of the steering wheel 101.

On the other hand, as shown in FIG. 6, in a case where the absolute value of the detected torque signal Tp outputted from the torque detector 210 is large, the correction amount α is set to be larger in the negative direction as the absolute value thereof becomes larger. At the clockwise rotation of the steering wheel 101, an electric signal corresponding to a value obtained by adding the correction amount α to the value shown by the detected torque signal Tp is set as the control torque signal Td(n). At the counterclockwise rotation of the steering wheel 101, an electric signal corresponding to a value obtained by subtracting the correction amount α from the value shown by the detected torque signal Tp is set as the control torque signal Td(n). Thus, the hysteresis that is larger than that of the detected torque signal Tp as the steering torque T becomes larger is obtained. As a result, in a case where the steering torque T is large, it is possible to improve stability of the steering wheel 101. Thereby, for example, since the driving torque in the turning-back direction of the electric motor 110 decreases when the steering wheel 101 is turned back, it is possible to stabilize behavior of the vehicle.

As described above, in the steering apparatus 100 according to the exemplary embodiment, since the hysteresis is adjusted over a wide region in cases where the steering torque T is small or large, it is possible to improve steering sense (steering characteristics) in a wide range, and thus it is possible to improve steering feeling and safety. In addition, since only the output value from the torque sensor 109 is used as a parameter, both improvement of the steering feeling and improvement of the safety are achieved by a simple configuration.

Further, by arbitrarily changing the correspondence between the detected torque signal Tp and the correction amount α, which has been exemplified in FIG. 6, it is possible to arbitrarily change a value (hysteresis) of the control torque signal Td with regard to the steering torque T. Thus, it is possible to change the hysteresis easily for every vehicle on which the steering apparatus 100 according to the exemplary embodiment is mounted.

The foregoing description of the exemplary embodiments of the present invention has been provided for the purposes of illustration and description. It is not intended to be exhaustive or to limit the invention to the precise forms disclosed. Obviously, many modifications and variations will be apparent to practitioners skilled in the art. The exemplary embodiments were chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. An electric power steering apparatus comprising:
   a detector that detects a value corresponding to a steering torque of a steering wheel;
   a correcting unit that corrects the detection value detected by the detector; and
   a target current calculating unit that calculates a target current which is supplied to an electric motor on the basis of the detection value corrected by the correcting unit, wherein
   the correcting unit makes a correction by using a correction value corresponding to the detection value detected by the detector so as to make a hysteresis between the detection value corrected by the correcting unit in one rotating direction of the steering wheel and the detection value corrected by the correcting unit in the other rotating direction of the steering wheel small in a case where an absolute value of the detection value detected by the detector is smaller than a predetermined value and large in a case where the absolute value is larger than the predetermined value, the detection value corrected by the correcting unit in the one rotating direction being obtained by correcting the detection value detected by the detector in the one rotating direction, the detection value corrected by the correcting unit in the other rotating direction being obtained by correcting the detection value detected by the detector in the other rotating direction.

2. The electric power steering apparatus according to claim 1, wherein
   a sign of the correction value of the correcting unit is inverted between a case where an absolute value of the detection value detected by the detector is smaller than a predetermined value and a case where the absolute value is larger than the predetermined value.

3. The electric power steering apparatus according to claim 2, wherein
   the correcting unit comprises a determination unit that determines the correction value on the basis of the detection value detected by the detector, and an output unit that corrects the detection value detected by the detector by performing four arithmetic operations using the correction value determined by the determination unit with regard to the detection value detected by the detector and outputs the corrected detection value.

4. The electric power steering apparatus according to claim 3, wherein
   on condition that a direction of the steering torque is set to be positive in a case where the direction is one rotating direction of the steering wheel and is set to be negative in a case where the direction is the other rotating direction, the determination unit of the correcting unit determines that a sign of the correction value is positive in a case where an absolute value of the detection value detected by the detector is smaller than a predetermined value, and negative in a case where the absolute value is larger than the predetermined value, and the output unit corrects the detection value detected by the detector by adding the correction value determined by the determination unit to the detection value detected by the detector in a case where the steering torque increases, and by subtracting the correction value determined by the determination unit from the detection value detected by the detector in a case where the steering torque decreases.

5. The electric power steering apparatus according to claim 1, wherein
   the correcting unit comprises a determination unit that determines the correction value on the basis of the detection value detected by the detector, and an output unit that corrects the detection value detected by the detector by performing four arithmetic operations using the correction value determined by the determination unit with regard to the detection value detected by the detector and outputs the corrected detection value.

6. The electric power steering apparatus according to claim 5, wherein
   on condition that a direction of the steering torque is set to be positive in a case where the direction is one rotating direction of the steering wheel and is set to be negative in a case where the direction is the other rotating direction, the determination unit of the correcting unit determines that a sign of the correction value is positive in a case where an absolute value of the detection value detected by the detector is smaller than a predetermined value, and negative in a case where the absolute value is larger than the predetermined value, and the output unit corrects the detection value detected by the detector by adding the correction value determined by the determination unit to the detection value detected by the detector in a case where the steering torque increases, and by subtracting the correction value determined by the determination unit from the detection value detected by the detector in a case where the steering torque decreases.

* * * * *